United States Patent
Finnemore et al.

(10) Patent No.: US 6,227,150 B1
(45) Date of Patent: May 8, 2001

(54) LOAD BASED CONTROL SYSTEM FOR ACTIVE LEAKAGE CONTROL IN AIR PREHEATER

(75) Inventors: Harlan E. Finnemore, Pocatello, ID (US); Danny K. Hall; Alan G. Marshall, both of Wellsville, NY (US); Robert J. Rausa, Nashua, NH (US); Kent E. Ritter, Wellsville, NY (US)

(73) Assignee: ABB Air Preheater, Inc., Wellsville, NY (US)

( * ) Notice: Subject to any disclaimer, the term of this patent is extended or adjusted under 35 U.S.C. 154(b) by 0 days.

(21) Appl. No.: 09/542,557

(22) Filed: Apr. 3, 2000

(51) Int. Cl.$^7$ ........................................ F23L 15/02
(52) U.S. Cl. ................................. 122/1 A; 165/9
(58) Field of Search .................... 122/1 A; 165/8, 165/9, 10; 432/39, 179, 180, 181

(56) References Cited

U.S. PATENT DOCUMENTS

| | | | |
|---|---|---|---|
| 4,313,489 | * | 2/1982 | Stockman ........................ 165/9 |
| 4,610,297 | * | 9/1986 | Gibson et al. ................... 165/9 |
| 5,038,849 | * | 8/1991 | Hagar .............................. 165/9 |
| 5,628,360 | * | 5/1997 | Brophy et al. .................. 165/9 |
| 5,697,619 | * | 12/1997 | Fierle ............................. 165/9 |

\* cited by examiner

*Primary Examiner*—Gregory Wilson
(74) *Attorney, Agent, or Firm*—Alix, Yale & Ristas, LLP (57) ABSTRACT

A rotary air preheater has a rotor, at least one seal disposed proximate to the rotor, a drive for reciprocally driving a portion of the seal between a first position adjacent the rotor and a second position spaced from the first position, and a control system for activating the drive. The control system includes a boiler load power sensor, means for storing a first stored boiler load having a value between the minimum boiler load and the maximum boiler load, and logic for comparing the sensed boiler load to the first stored boiler load. The logic provides a first activation signal to the drive when the sensed boiler load rises above the first stored boiler load and a second activation signal to the drive when the sensed boiler load falls below the first stored boiler load. The first activation signal activates the drive to drive the portion of the seal to the first position and the second activation signal activates the drive to drive the portion of the seal to the second position.

12 Claims, 6 Drawing Sheets

LOAD BASED CONTROL SYSTEM FOR ACTIVE LEAKAGE CONTROL IN AIR PREHEATER

BACKGROUND OF THE INVENTION

The present invention relates to rotary regenerative air preheaters having sector plates dividing the air preheater into a gas sector and one or more air sectors and having radial seals which cooperate with the sector plates to reduce the leakage between the air preheater sectors. More particularly, the invention relates to control systems for sector plate drive means for adjusting the position of the sector plates relative to the radial seals.

A rotary regenerative air preheater transfers sensible heat from the flue gas leaving a boiler to the entering combustion air through regenerative heat transfer surface in a rotor which turns continuously through the gas and air streams. The rotor, which is packed with the heat transfer surface, is divided into compartments by a number of radially extending plates referred to as diaphragms. These compartments are adapted to hold modular baskets in which the heat transfer surface is contained.

The air preheater is divided into a flue gas side or sector and one or more combustion air sides or sectors by sector plates. Flexible radial seals on the rotor, usually mounted on the top and bottom edges of the diaphragms, are in close proximity to these sector plates and minimize leakage of gas and air between sectors. In a typical rotary regenerative heat exchanger, the hot flue gas and the combustion air enter the rotor shell from opposite ends and pass in opposite directions over the heat exchange material housed within the rotor. Consequently, the cold air inlet and the cooled gas outlet are at one end of the heat exchanger, usually the bottom and referred to as the cold end, and the hot gas inlet and the heated air outlet are at the opposite end of the heat exchanger, usually the top and referred to as the hot end. As a result, an axial temperature gradient exists from the hot end of the rotor to the cold end of the rotor. In response to this temperature gradient, the rotor tends to distort and to assume a shape similar to that of an inverted dish (commonly referred to as rotor turndown). As a result, the radial seals mounted on the top edges of the diaphragms are pulled away from the sector plates with the greater separation occurring at the outer radius of the rotor. This opens a gap permitting the undesired intermingling of the gas and the air.

Various schemes have been developed to maintain the seal between the radial seals mounted on the diaphragms and the sector plates during this temperature change. It is well known that rotary regenerative air preheaters utilize a flexible sealing member that extends across the gap between the diaphragms and the sector plates. As the rotor transitions from a cold, non-operating condition to a hot, operating condition, the temperature gradient along the rotor increases, and the gap between the hot end diaphragms and the sector plates increases. These flexible sealing members are designed to maintain contact with the sector plate.

However, these seals are subject to a number of problems. It has been experienced that the continuous contact between the sealing member and the sector plates results in wear to both the sealing member and the sector plates. Special liners are sometimes utilized to reduce sealing surface wear. However, use of such liners results in higher capital and labor costs. Further, those seals are subject to premature failure due to flexure and edge fracturing. Finally, the amount of gap that may be closed by these seals is limited.

SUMMARY OF THE INVENTION

The present invention provides a control system in an air preheater for maintaining a controlled gap between the rotor and the sector plates or axial seal to reduce leakage. The rotary preheater of the present invention includes at least one seal means (the sector plates or the axial seal) disposed proximate to the rotor and cooperating with the rotor to retard leakage around the rotor. The preheater also includes drive means activatable for reciprocally driving at least a portion of the seal means between a first position adjacent the rotor and a second position spaced from the first position. The control system includes power sensing means for sensing the boiler load, storage means for storing a first stored boiler load having a value between the minimum boiler load and the maximum boiler load, and logic means for comparing the sensed boiler load to the first stored boiler load. The logic means provides a first activation signal to the drive means when the sensed boiler load rises above the first stored boiler load and a second activation signal to the drive means when the sensed boiler load falls below the first stored boiler load. The first activation signal activates the drive means to drive the portion of each of the seal means to the first position and the second activation signal activates the drive means to drive the portion of the seal means to the second position.

For example, the hot end seals which extend from the diaphragm plates of the rotor move away from the hot end sector plates by an amount increasing from the inboard end to the outboard end as the air preheater progresses from a cold condition to a hot condition. In accordance with the subject invention, the first activation signal causes the drive means to drive the outboard end portion of the sector plates toward the hot end seals of the rotor to close this increasing gap when the sensed boiler load reaches a predetermined value.

It is an object of the invention to provide a new and improved control system for active leakage control in an air preheater.

It is also an object of the invention to provide a control system to control leakage around the rotor of an air preheater that does not require sensors within the air preheater.

Other objects and advantages of the invention will become apparent from the drawings and specification.

DESCRIPTION OF THE PREFERRED EMBODIMENTS

Figure 1:
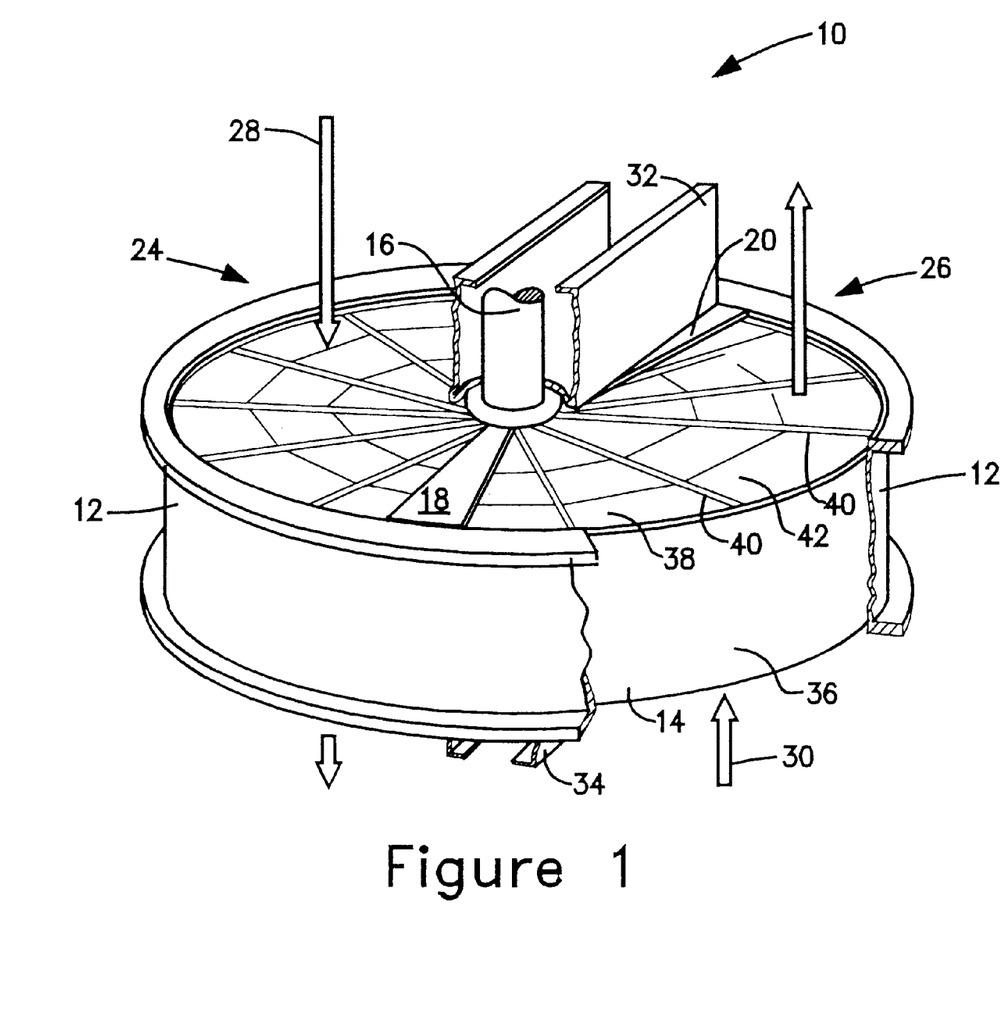
FIG. 1 is a general perspective view of a conventional rotary regenerative air preheater.

FIG. 1 of the drawings is a partially cut-away perspective view of a typical bi-sector air preheater 10 showing a housing 12 in which the rotor 14 is mounted on a drive shaft or post 16. The housing is divided by means of the flow impervious sector plates 18 and 20 into a flue gas sector 24 and an air sector 26. Corresponding sector plates are also located on the bottom of the unit. The hot flue gases enter the air preheater 10 as indicated by the arrow 28, flow through the flue gas sector 24 where heat is transferred to the heat transfer surface in the rotor 14. As this hot heat transfer surface then rotates through the air sector 26, the heat is transferred to the air flowing through the rotor from the bottom as indicated by the arrow 30. Consequently, the cold air inlet and the cooled gas outlet define a cold bottom end and the hot gas inlet and the heated air outlet define a hot top end. Located on the top end of the housing is the hot end center section 32 with a corresponding cold end center section 34 on the bottom end. The rotor 14 has a shell 36 and is divided into a plurality of pie-shaped compartments 38 by the diaphragm plates 40 with each compartment containing a plurality of heat exchange basket modules 42.

Figure 2:
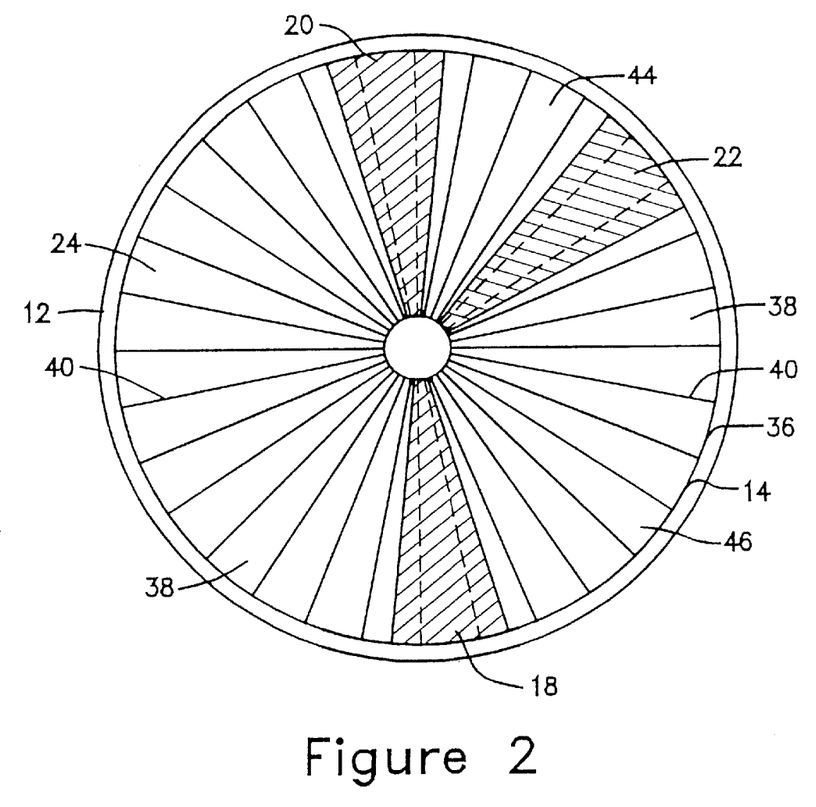
FIG. 2 is a simplified top view of a trisector air preheater showing the rotor in the housing and showing the sector plates.

FIG. 2 is a plan view representation of a trisector air preheater comprising the rotor housing 12 and the rotor 14. The housing is divided in this case into three sectors by the sector plates 18, 20 and 22. The sectors are the flue gas sector 24 and the air sector 26 which is divided into the primary air sector 44 and the secondary air sector 46. This figure illustrates the sector plates in cross-section for purposes of clarity. The rotor 14 is composed of the shell 36 and the diaphragm plates 40 dividing the rotor into compartments 38. Attached to the top and bottom edges of these diaphragm plates 40 are the radial seals.

Figure 3:
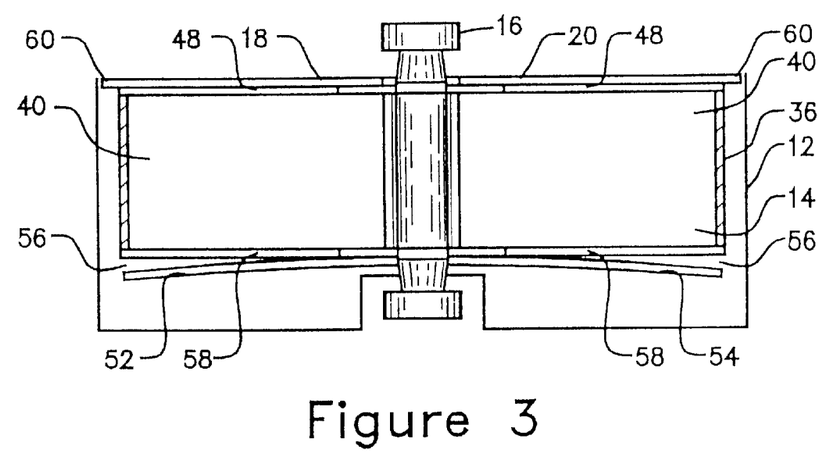
FIG. 3 is a diagrammatic representation of a rotary regenerative heat air preheater in the cold state.

When the air preheater 10 is put into service, the rotor 14 is cold and the relationship of the rotor 14 to the sector plates 18, 20 is depicted in FIG. 3. This figure shows the rotor housing 12, the rotor 14 composed of the rotor shell 36 and the diaphragm plates 40 and the sector plates 18, 20. On top of the diaphragm plates 40 are the radial seals 48 which will be shown in some more detail in later figures but which may be of any conventional radial seal design. As can be seen in this FIG. 3, the radial seals 48 are engaging or in close proximity to the sector plates 18, 20 to form the desired seal.

Figure 4:
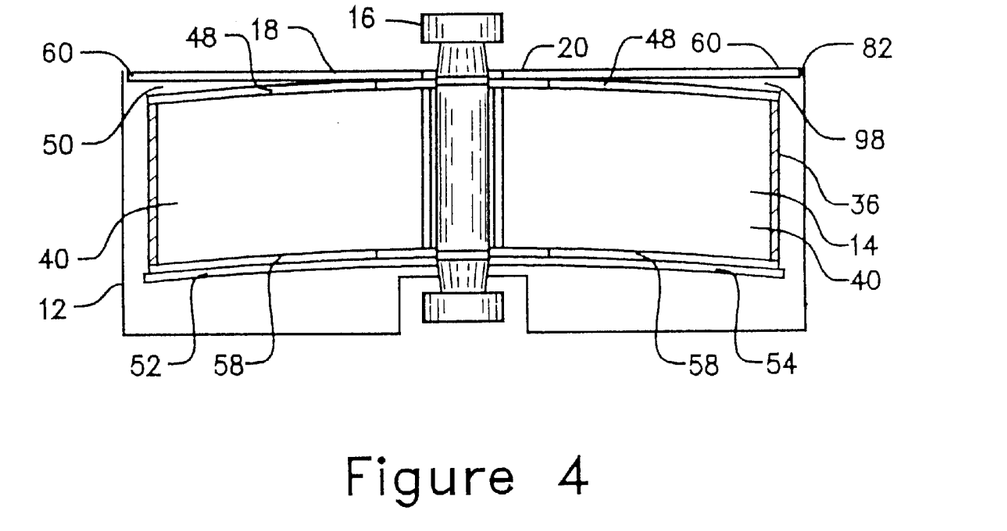
FIG. 4 is a diagrammatic representation similar to FIG. 3 showing rotor turndown with the sector plates in the fully up position.

As the moving rotor 14 progresses from a cold non-operating condition to a hot operating condition, an axial temperature gradient develops from the hot top end of the rotor to the cold bottom end of the rotor as a result of heat exchange between the counter-flowing air and gas streams. This axial temperature gradient causes the rotor 14 to distort such as shown in FIG. 4. This is referred to as rotor turndown. As a result, the radial seals 48 mounted on the hot end of the diaphragm plates 40 are pulled away from the sector plates 18, 20 with the greater separation occurring at the periphery of the rotor 14. This opens a gap 50 between the radial seals 48 and the sector plates 18, 20 which would allow flow between sectors, resulting in an undesired intermingling of the gas and air. By contrast, the sector plates 52 and 54 on the bottom cold end are shaped and mounted to start out in the cold condition with a preadjusted gap 56 at the periphery between the sector plates 52, 54 and the radial seals 58 as seen in FIG. 3. As the rotor is heated and rotor turndown occurs, this gap 56 is closed as shown in FIG. 4.

Figure 5:
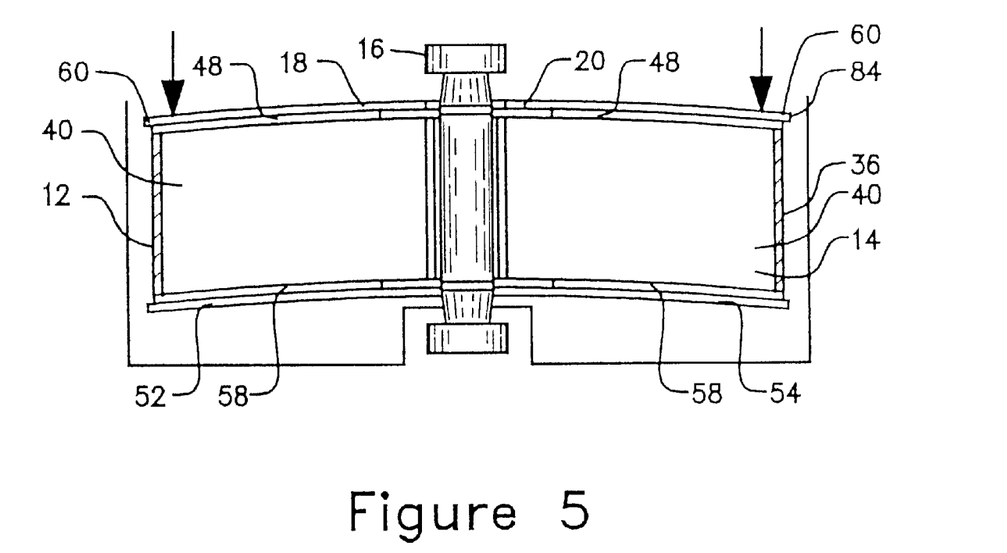
FIG. 5 is a further diagrammatic representation similar to FIG. 4 but with the sector plates in the fully down position.

To close the gap 50 created by rotor heating and turndown, the hot end sector plates 18, 20 are driven so that the outboard end portions 60 of the sector plates 18, 20 move toward the rotor 14. This is illustrated in FIG. 5 where it can be seen that the outboard portions 60 of the sector plates 18, 20 have been forced downwardly back into contact with the radial seals 48. A sector plate drive system 62 is used to reciprocate the sector plates 18, 20 up or down and thereby close gap 50.

Figure 6:
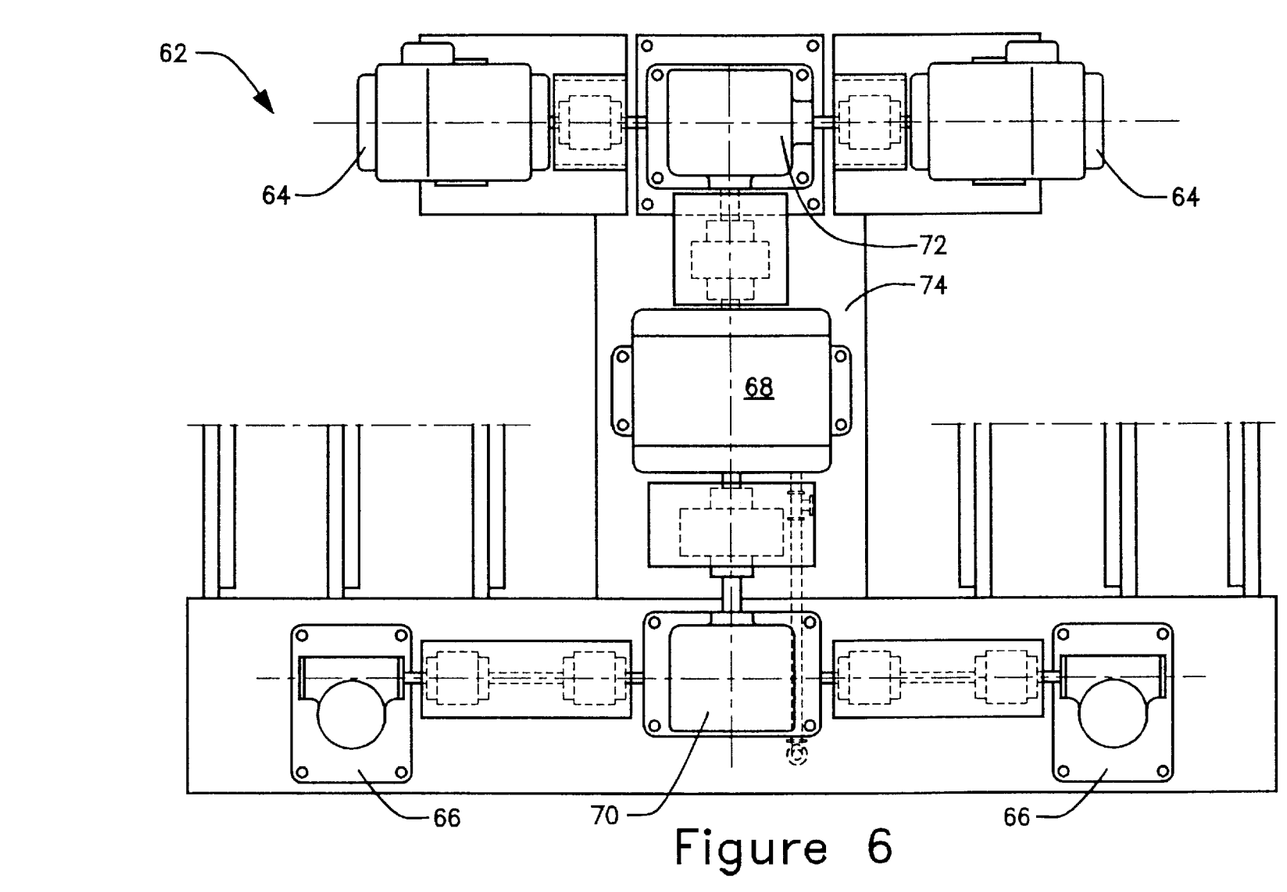
FIG. 6 is a top view of one embodiment of the sector plate drive system.
Figure 7:
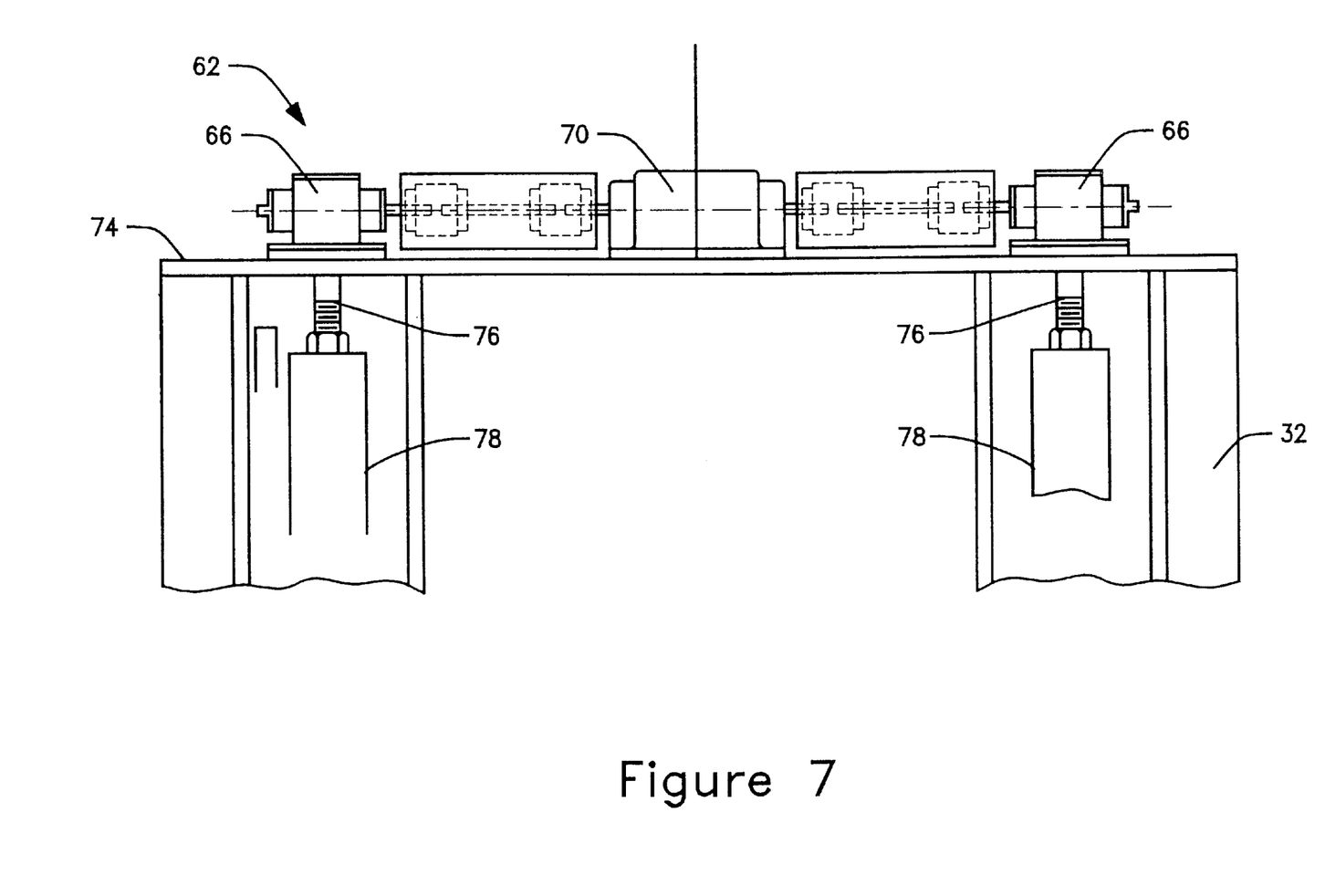
FIG. 7 is an end view of the sector plate drive assembly of FIG. 6.

In a first embodiment, the sector plate drive system 62 includes one or two electric motors 64 which drive two mechanical screw actuators 66 via a speed reducer 68 and a first 3-way mitre box 70. If two electric motors 64 are utilized, each of the motor drives is coupled to the speed reducer 68 by a second 3-way mitre box 72. The electric motors 64, 3-way mitre boxes 70, 72, speed reducer 68, and mechanical screw actuators 66 are all mounted to a welded steel base 74 which is mounted to the hot end center section 32. The drive of each mechanical screw actuator 66 is connected to a sector plate 18, 20 by a linkage rod 76. A sealing/guiding assembly 78 maintains linkage alignment and prevents leakage from occurring outward around the rod 76.

Another embodiment of the sector plate drive system is disclosed in U.S. patent application Ser. No. 09/339,250, filed Sep. 20, 1999 and assigned to the assignee of the subject application and incorporated herein by reference. This application discloses a sector plate drive assembly which utilizes a drive shaft, dual drive belts, dual drive cylinders, and dual eccentric disk devices to reciprocate the sector plates 18, 20.

In conventional sector plate drive systems, the drive means (the electric motor(s) or drive shaft) is operated by a control system in response to either changes in seal clearance or the temperature differential between the hot and cold ends of the rotor.

The seal clearance is detected by rotor position sensors attached to each hot end sector plate which are actuated upon contact by the rotor T-bar located on the outer circumference of the rotor. When the system is in the "auto" mode, the drive means moves the outboard ends of the sector plates toward the rotor. Upon contact with the rotor T-bar, the sensor signals the drive to stop and retract the sector plate a small distance from the rotor, leaving a nominal clearance at the periphery. It should be appreciated that the rotor position sensors are subject to wear, high temperatures, and vibration due to the rotary movement of the air preheater. In addition, transients in the operation of the air preheater can cause mechanical shock damage to these sensors.

The temperature differential is sensed by sensors mounted in the gas inlet and gas outlet ducts. The control system operates the drive means to close the gap when the desired temperatures are reached. It should be appreciated that the sensors in the gas inlet are also exposed to high temperatures and both temperature sensors are also subject to vibration and mechanical shock.

In an air preheater leakage control system 80 in accordance with the present invention, the position of the sector plates 18, 20 is controlled on the basis of the boiler power output or boiler load. It has been discovered that the actual temperatures of the gas and air flow in a power boiler stabilize within a rather narrow range of full load temperature at a rather low percentage of full load operation. Only the flow volumes change significantly. This permits a very close approximation of air preheater rotor turndown and seal clearance based simply on the boiler load. By measuring the boiler load and controlling the sector plate drive system 62 on the basis of the boiler load, the need for the sector plate position sensors or the differential temperature sensors is eliminated.

In a preferred embodiment, the subject invention comprises a two position system where the outboard portion 60 of sector plates 18, 20 may be driven from a fully up position 82 (FIG. 4) to a fully down position, 84 (FIG. 5), with the length of the sector plate travel based on a percentage of calculated full load rotor turndown. The subject air preheater leakage control system 80 utilizes a first predetermined percentage of boiler load, stored in a memory section 86 of the control system 80, to activate the sector plate drive system 62. The value is based on the load demands of the boiler. For example, the value of the selected initiation boiler load may be as low as 35% of boiler load, where approximately 75% of the full rotor turndown will have occurred. Based on duty cycle or other customer requirements, a percentage of boiler load closer to full load operation may be desired.

Figure 8:
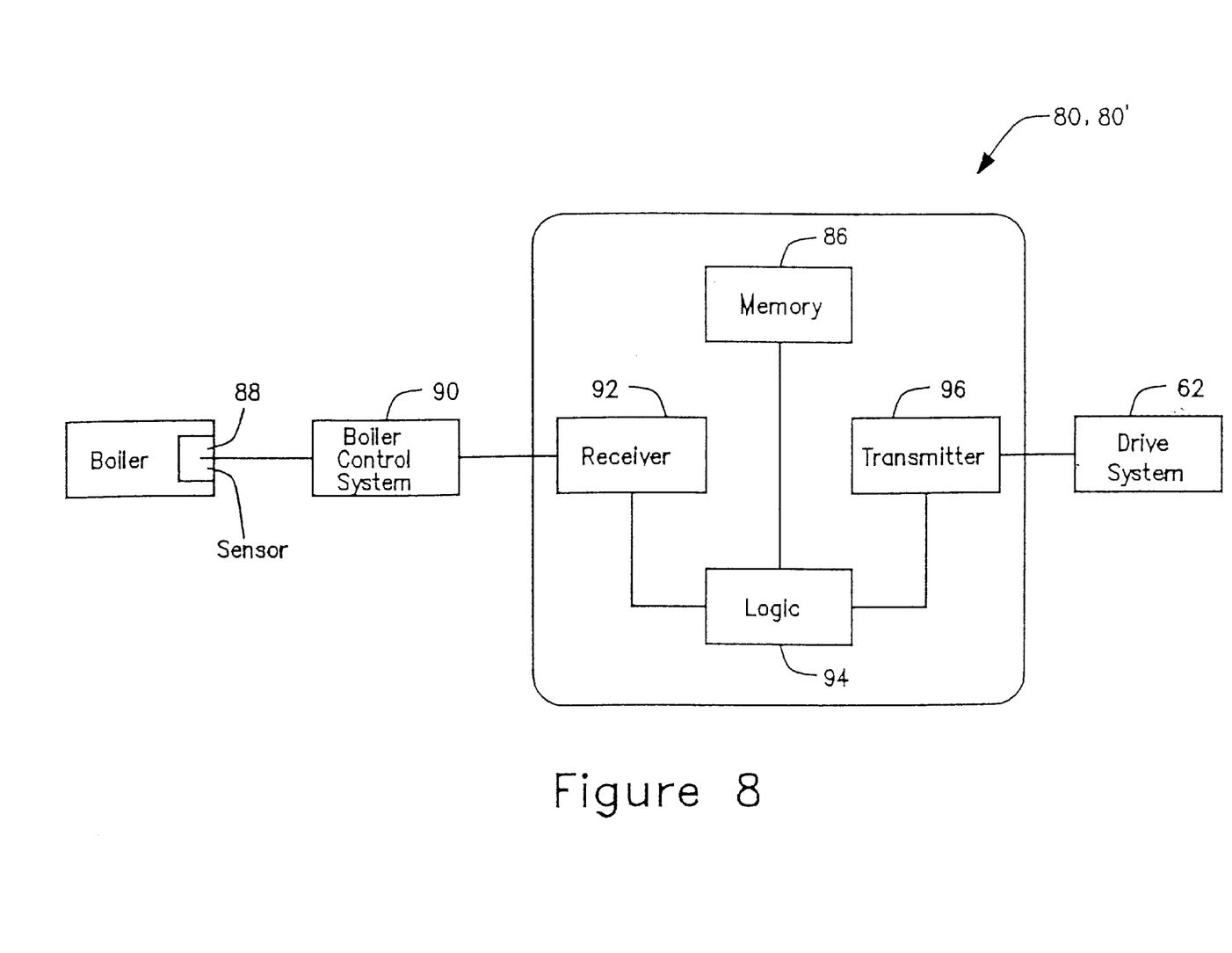
FIG. 8 is a schematic view of a control system in accordance with the invention.

The subject air preheater leakage control system 80 utilizes a boiler load sensor 88 which is part of the boiler control system 90 for sensing the boiler load. A signal proportional to the boiler load is transmitted by the boiler load sensor 88 and received in a receiver portion 92 of the control system 80. When the sensed operating load rises above the stored first boiler load value, the logic section 94 of the control system 80 transmits an activation signal via a transmitter portion 96 of the control system 80. The activation signal activates the sector plate drive system 62 to drive the outboard portions 60 of the sector plates 18, 20 downward from the fully up position 82 to the fully down position 84 and thereby close the gap 50. If the sensed boiler load falls below the first boiler load value, the subject control system 80 activates the sector plate drive system 62 to withdraw the outboard portions 60 of the sector plates 18, 20 from the fully down position 84 to the fully up position 82.

If the boiler load is anticipated to be above the first boiler load value for the greatest percentage of the time, the control system logic 94 cycles the sector plate drive system 62 from the fully down position 84, to the fully up position 82, and back to the fully down position 84, at a periodic interval to assure the sealing surface remains free to travel.

Because there is no need to protect a sensing device from wear, there is no need to back the sector plate 18, 20 away from the rotor 14 as is required with a rotor sensing system when contact is made with the rotor. If the initiation point is set at levels of operating load approaching or at full boiler load, sealing effectiveness may actually exceed the more complicated control system for this reason.

The above described control system 80 is a two position systems, where the outboard portions 60 of the sector plates 18, 20 are moved between fully up and fully down positions 82, 84. Alternatively, the control system 80' may position the outboard portions 60 of the sector plates 18, 20 at three or more positions, where the additional positions are intermediate positions 98 (FIG. 4) located between the fully up and fully down positions 82, 84. In a three position system, the control system 80' initiates moving outboard portions 60 from the fully up position 82 to a single intermediate position 98 when the sensed boiler load rises above a predetermined intermediate boiler load value, the intermediate boiler load value being between the minimum, or zero power, boiler load value and the first boiler load value.

The control system 80' maintains outboard portions 60 in the intermediate position 98 until the sensed boiler load either rises above the first boiler load value or drops below the intermediate boiler load value. If the sensed boiler load drops below the intermediate boiler load value, the control system 80' returns the outboard portions 60 to the fully up position 82. If the sensed boiler load rises above the first boiler load value, the control system 80' moves the outboard portions 60 to the fully down position 84. The control system 80' maintains the outboard portions 60 in the fully down position 84 so long as the sensed boiler load is greater than the first boiler load value. If the boiler load drops below the first boiler load value, the control system 80' initiates movement of outboard portions 60 to the intermediate position 98. As previously described, the control system 80' maintains outboard portions 60 in the intermediate position 98 until the sensed boiler load either rises above the first boiler load value or drops below the intermediate boiler load value.

It is possible for the subject control system to move the outboard portions of the sector plates 18, 20 over a continuous range of positions between the fully up position 82 and the fully down position 84, depending on the value of the boiler load. However, the control band is so narrow (approximately 75% of rotor turndown occurs at 35% of boiler load and approximately 90% of rotor turndown occurs at 70% of boiler load) that the control system is effectively limited to a relatively small number of positions.

The subject control system 80, 80', then, achieves a close sealing relationship with the rotor 14 over the greatest majority of operating conditions while eliminating any need to sense actual position of the air preheater rotor or temperatures of the gas or air flows.

The two position control system 80 may also be applied to the axial seal plates where applicable, for example in installations where separate primary preheaters are employed, as the simplicity and lower cost of the subject control system allows such use to be cost effective. Conventional systems are sufficiently complex and costly so as to have precluded axial sealing applications.

Although the invention has been described with respect to an air preheater with the hot end on the top and with the drive assembly mounted on the top, the invention is equally applicable to an air preheater with the hot end and the drive assembly on the bottom. Likewise, the invention may be applied to a horizontal flow air preheater with a horizontal shaft and with the drive assembly mounted on the hot vertical end.

What is claimed is:

1. An improvement in a rotary regenerative air preheater for a power boiler, said power boiler producing power from a minimum boiler load to a maximum boiler load, said preheater having a cold axial end with an air inlet and a flue gas outlet and a hot axial end with a heated air outlet and a flue gas inlet and having hot end sector plates on said hot axial end dividing said air preheater into a flue gas sector and at least one air sector and further having a rotor with hot end radially extending seals cooperating with said hot end sector plates to form seals between said sectors and wherein said hot end sector plates and said hot end radially extending seals each have inboard portions adjacent the center of said rotor and outboard portions adjacent the periphery of said rotor and wherein said hot end radially extending seals move away from said hot end sector plates by an amount increasing from said inboard portions to said outboard portions as said air preheater progresses from a cold condition to a hot condition, said air preheater further having drive means activatable for reciprocally driving said outboard portion of each of said sector plates between a first position adjacent said hot end radially extending seals and a second position axially spaced from said first position, said improvement comprising control means for controlling said drive means, said control means comprising:

power sensing means for sensing said boiler load and providing a power signal which is proportional to said sensed boiler load;

storage means for storing a predetermined first boiler load value, said first boiler load value being between said minimum boiler load and said maximum boiler load; and logic means for comparing said power signal to said first boiler load value and providing a first activation signal to said drive means when said sensed boiler load rises above said first boiler load value;

wherein said first activation signal activates said drive means to drive said outboard portion of each of said sector plates to said first position.

2. An improvement as recited in claim 1 wherein said logic means provides a second activation signal to said drive means when said sensed boiler load falls below said first boiler load value, wherein said second activation signal activates said drive means to drive said outboard portion of each of said sector plates to said second position.

3. An improvement as recited in claim 1 wherein said storage means also stores at least one predetermined intermediate boiler load value, each of said intermediate boiler load values being between said first boiler load value and said minimum boiler load, said logic means providing a third activation signal to said drive means when said sensed boiler load rises above said intermediate boiler load value, wherein said third activation signal activates said drive means to drive said outboard portion of each of said sector plates to an intermediate position disposed between said first and second positions.

4. An improvement as recited in claim 3 wherein said logic means provides a fourth activation signal to said drive means when said sensed boiler load falls below said intermediate boiler load value, wherein said fourth activation signal activates said drive means to drive said outboard portion of each of said sector plates to said second position.

5. An improvement as recited in claim 3 wherein said logic means provides a fifth activation signal to said drive means when said sensed boiler load falls below said first boiler load value, wherein said fifth activation signal activates said drive means to drive said outboard portion of each of said sector plates to said intermediate position.

6. A method of controlling a drive means of a rotary regenerative air preheater for a power boiler, said power boiler producing power from a minimum boiler load to a maximum boiler load, said preheater having a rotor, a seal plate, and a control system including logic means and storage means, said drive means being activatable for reciprocally driving at least a portion of said seal plate between a first position adjacent said rotor and a second position spaced from said first position, the method comprising the steps of:

storing a predetermined first boiler load value in said storage means of said control system, said first boiler load value being between said minimum boiler load and said maximum boiler load;

sensing said boiler load;

comparing said sensed boiler load to said first boiler load value in said logic means of said control system;

activating said drive means to drive said seal plate to said first position when said sensed boiler load rises above said first boiler load value.

7. The method of controlling a drive means as recited in claim 6 further comprising the step of activating said drive means to drive said seal plate to said second position when said sensed boiler load falls below said first boiler load value.

8. The method of controlling a drive means as recited in claim 6 further comprising the steps of:

storing at least one predetermined intermediate boiler load value in said storage means of said control system, each of said intermediate boiler load values being between said first boiler load value and said minimum boiler load;

comparing said sensed boiler load to said intermediate boiler load value in said logic means of said control system; and activating said drive means to drive said seal plate to an intermediate position disposed between said first and second positions when said sensed boiler load rises above said intermediate boiler load value.

9. The method of controlling a drive means as recited in claim 8 further comprising the steps of:

comparing said sensed boiler load to said intermediate boiler load value in said logic means of said control system; and activating said drive means to drive said seal plate to said second position when said sensed boiler load falls below said intermediate boiler load value.

10. The method of controlling a drive means as recited in claim 9 further comprising the steps of:

comparing said sensed boiler load to said intermediate boiler load value in said logic means of said control system; and activating said drive means to drive said seal plate to said intermediate position when said sensed boiler load falls below said first boiler load value.

11. A rotary regenerative air preheater for a power boiler producing power from a minimum boiler load to a maximum boiler load, said preheater comprising:

a rotor;

at least one seal means disposed proximate to said rotor, said seal means cooperating with said rotor to retard leakage around said rotor;

drive means activatable for reciprocally driving at least a portion of a said seal means between a first position adjacent said rotor and a second position spaced from said first position; and control means for controlling said drive means, said control means comprising power sensing means for sensing said boiler load;

storage means for storing a first stored boiler load having a value between said minimum boiler load and said maximum boiler load; and logic means for comparing said sensed boiler load to said first stored boiler load and providing a first activation signal to said drive means when said sensed boiler load rises above said first stored boiler load and a second activation signal to said drive means when said sensed boiler load falls below said first stored boiler load;

wherein said first activation signal activates said drive means to drive said portion of said seal means to said first position and said second activation signal activates said drive means to drive said portion of said seal means to said second position.

12. A rotary regenerative air preheater for a power boiler producing power from a minimum boiler load to a maximum boiler load, said preheater having oppositely disposed cold and hot axial ends and comprising:

a rotor having hot end radially extending seals;

hot end sector plates disposed on said hot axial end dividing said air preheater into a flue gas sector and at least one air sector, said hot end sector plates cooperating with said seals to retard leakage around said rotor;

drive means activatable for reciprocally driving at least a portion of each of said sector plates between a first position adjacent said rotor and a second position axially spaced from said first position; and control means for controlling said drive means, said control means comprising power sensing means for sensing said boiler load;

storage means for storing a first stored boiler load having a value between said minimum boiler load and said maximum boiler load and a value of at least one second boiler load, each of said second boiler loads being between said first stored boiler load value and said minimum boiler load; and logic means for comparing said sensed boiler load to said first and second stored boiler loads and providing:

a first activation signal to said drive means when said sensed boiler load rises above said first stored boiler load, a second activation signal to said drive means when said sensed boiler load falls below said first stored boiler load, a third activation signal to said drive means when said sensed boiler load rises above said second boiler load, a fourth activation signal to said drive means when said sensed boiler load falls below said second boiler load, wherein said first activation signal activates said drive means to drive said portion of said sector plates to said first position, said second activation signal activates said drive means to drive said portion of said sector plates to an intermediate position disposed between said first and second positions, said third activation signal activates said drive means to drive said portion of said sector plates to said intermediate position, and said fourth activation signal activates said drive means to drive said portion of said sector plates to said second position.

* * * * *